United States Patent [19]

Iwata et al.

[11] 4,072,963
[45] * Feb. 7, 1978

[54] PROGRAMME-CONTROLLED SHUTTER

[75] Inventors: Hiroshi Iwata, Osaka; Katsuji Ishikawa, Higashi-Osaka, both of Japan

[73] Assignee: West Electric Co., Ltd., Japan

[*] Notice: The portion of the term of this patent subsequent to Dec. 14, 1993, has been disclaimed.

[21] Appl. No.: 679,996

[22] Filed: Apr. 26, 1976

[30] Foreign Application Priority Data

Apr. 30, 1975 Japan ................................. 50-52982

[51] Int. Cl.² ............................................. G03B 7/08
[52] U.S. Cl. .................................. 354/31; 354/23 D; 354/29; 354/44; 354/60 A
[58] Field of Search .................. 354/23 D, 31, 43, 44, 354/60 A, 29

[56] References Cited

U.S. PATENT DOCUMENTS

| | | | |
|---|---|---|---|
| 3,997,905 | 12/1976 | Iwata et al. | 354/44 |
| 4,005,448 | 1/1977 | Iwata et al. | 354/60 R |

Primary Examiner—Russell E. Adams
Attorney, Agent, or Firm—Burgess, Ryan and Wayne

[57] ABSTRACT

The invention discloses a programme-controlled shutter of the type in which a control circuit controls an exposure control mechanism consisting of a stepping motor and a plurality of shutter blades which also function as aperture setting blades in such a way that the exposure control mechanism sets the optimum aperture for the optimum time interval in response to the brightness of a subject, whereby the optimum exposure is ensured.

21 Claims, 14 Drawing Figures

PROGRAMME-CONTROLLED SHUTTER

BACKGROUND OF THE INVENTION

The present invention relates to a programme-controlled shutter capable of attaining the optimum exposure in response to the brightness of a subject.

There has been devised and demonstrated a programme-controlled shutter of the type consisting of shutter blades driven by a shutter mechanism and aperture setting blades or diaphragms driven by a servomotor. In this shutter, the shutter blades and the aperture setting blades are controlled by two aperture control means so that the optimum exposure may be obtained by a suitable combination of an aperture and an exposure time. However, this shutter has a distinct defect that its mechanical construction is very complex because the shutter incorporates not only an aperture setting mechanism for setting an aperture but also a shutter mechanism for setting an exposure time.

The shutter mechanism utilizes the energy stored in a spring when the film is advanced so that it must incorporate means for storing the spring energy. Furthermore strong shock is encountered when the spring energy is transmitted to the shutter mechanism, causing the shaking of a camera with the result of blurring of a picture.

SUMMARY OF THE INVENTION

One of the objects of the present invention is to provide a programme-controlled shutter in which shutter blades which also function as aperture setting blades are driven electrically, not by the mechanical spring force.

Another object of the present invention is to provide a programme-controlled shutter which is very simple in mechanical construction and which can attain the optimum exposure in response to the brightness of a subject.

A further object of the present invention is to provide a programme-controlled shutter in which a stepping motor is used as a driving means for opening and closing the shutter blades which also function as aperture setting blades and the stepping motor is controlled by a control circuit in response to the brightness of a subject, whereby the optimum exposure may be attained.

To the above and other ends, the present invention provides a programme-controlled shutter comprising an exposure control mechanism comprising a stepping motor and a plurality of shutter blades which also function as aperture setting blades or diaphragms and which are mechanically coupled to said stepping motor so as to be opened and closed; a motor control circuit having a first input terminal to which are applied the driving pulse signals for driving said stepping motor and a second input terminal to which is applied the signal for determining the direction of rotation of said stepping motor; a pulse generator circuit for generating in succession said driving pulse signals; a memory circuit having a plurality of output terminals and generating, in response to the number of the pulses signals applied from said pulse generator circuit, the outputs at said plurality of output terminals; a first control means including a first photometric circuit for detecting the brightness of a subject and comparing the output signals from said output terminals of said memory circuit with the output signal from said first photometric circuit, thereby controlling the pulse generator circuit; and a second control means including a second photometric circuit for measuring the brightness of a subject and generating the closing signal when the signal representative of the brightness of a subject measured by said second photometric circuit is integrated and reaches a predetermined level, said closing signal being applied to said second input terminal of said motor control circuit and said first control means, whereby said shutter blades are closed.

BRIEF DESCRIPTION OF THE DRAWINGS

FIG. 2 (composed of FIGS. 2A and 2B) is a diagram of an electric circuit of a first embodiment of a programme-controlled shutter in accordance with the present invention;

Figure 1A:
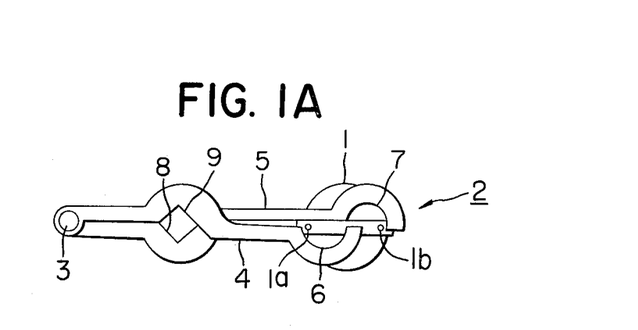
FIGS. 1a and 1b are front and top views of an exposure control means used in a programme-controlled shutter in accordance with the present invention.
Figure 1B:
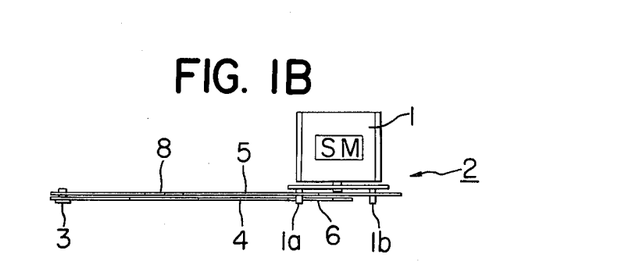

DESCRIPTION OF THE PREFERRED EMBODIMENTS:

Exposure Control Mechanism, FIGS. 1a and 1b

In FIGS. 1a and 1b there is shown an exposure control mechanism generally designated by the reference numeral 2 and comprising a stepping motor 1 of a conventional type and shutter blades 4 and 5 having their one ends pivoted with a common pivot pin 3. The other end of each shutter blade 4 or 5 is terminated into a semicircular cam surface 6 or 7 in engagement with a driving pin 1a or 1b of the stepping motor 1 so that when the stepping motor 1 is driven the shutter blades 4 and 5 rotate about the common pivot pin 3 and V-shaped aperture setting sections 8 and 9 coact to set an aperture depending upon the angle of rotation of the stepping motor 1.

Figures 2, 2B:
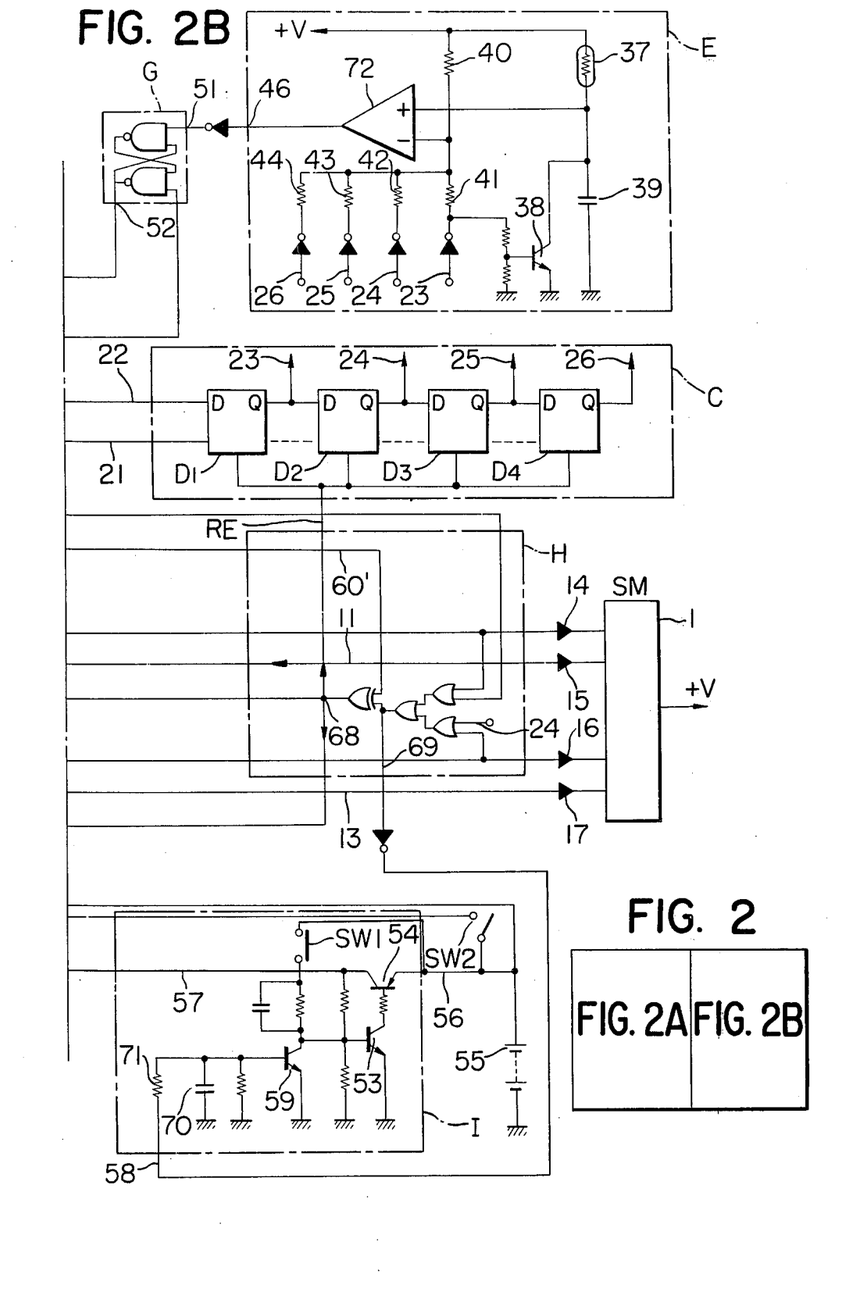
Figure 2A:
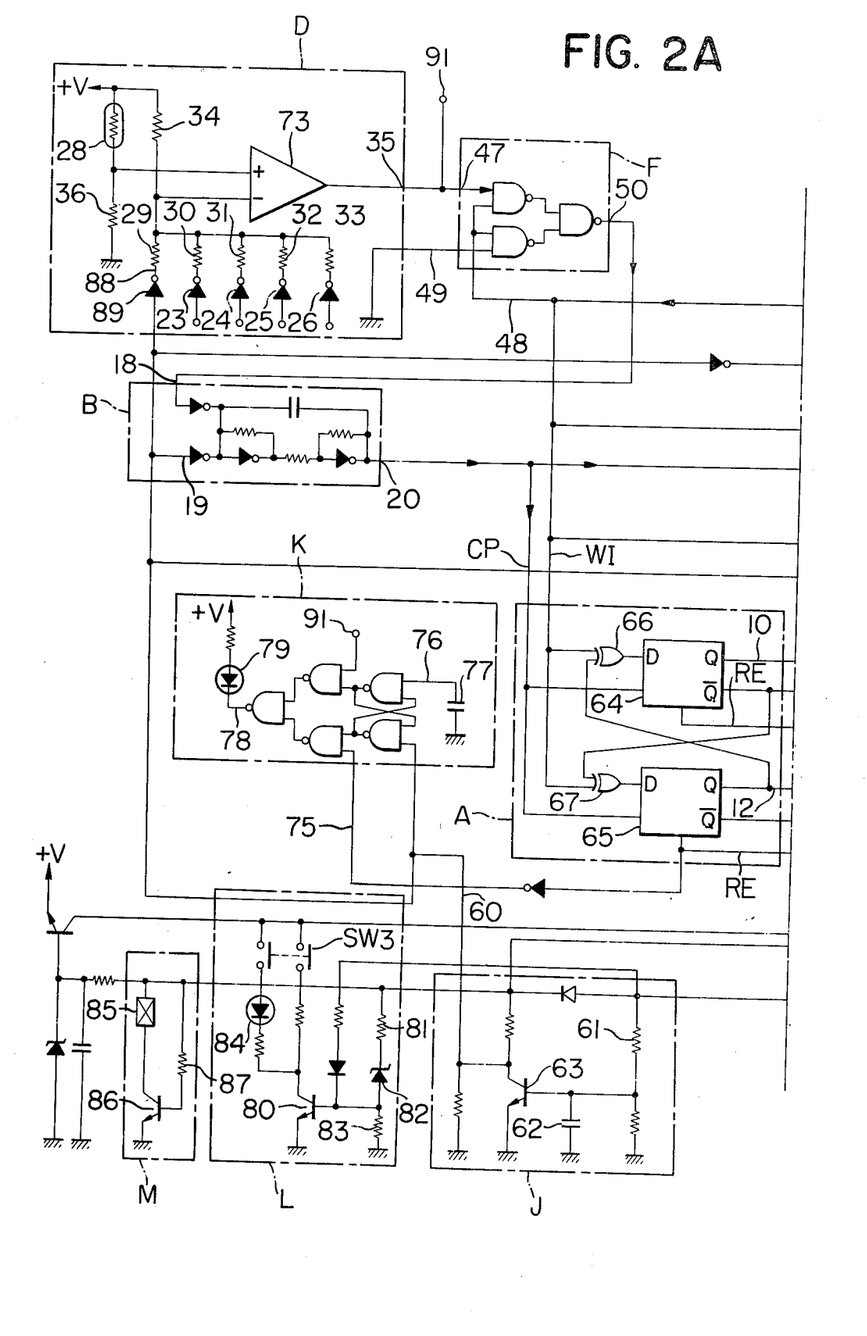

Control Circuit, FIG. 2

The operation of the exposure control mechanism 2 is controlled by a control circuit shown in FIG. 2 and comprising, as will be described in more detail, a motor control circuit A,
a pulse generator circuit B,
a memory circuit C,
a brightness-level selecting circuit D,
an exposure time control circuit E,
a drive control circuit F,
a closing-signal generating circuit G,
a reset circuit H,
a power circuit I, and
a reset release circuit J.

Motor Control Circuit A

The function of the motor control circuit A is to control the stepping motor 1 of the exposure control mechanism 2 and includes an input terminal CP to which is applied the pulse signal in response to which the stepping motor 1 is driven, a direction terminal WI to which is applied the signal in response to which the direction of the rotation of the stepping motor 1 is determined and a reset terminal RH to which is applied the reset signal in response to which the stepping motor 1 is reset to a predetermined initial position from which the stepping motor 1 always starts the rotation. For instance, when a driving system employed is such that two out of four driving coils of the stepping motor 1 are selectively excited, the motor control circuit A is connected through buffer amplifiers 14, 15, 16 and 17 to the driving coils of the stepping motor 1.

Pulse Generator Circuit B

In response to the low-level signals applied to input terminals 18 and 19, the pulse generator circuit B is triggered so that the output pulses are applied from an output terminal 20 to the input terminal CP of the motor control circuit A and to an input terminal 21 of the memory circuit C. The circuit B is de-activated in response to the high-level signal applied to the terminal 18.

Memory Circuit C

The memory circuit C consists of a shift register which stores the high- or low-level signal applied to an input terminal 22 in response to the pulses from the pulse generator circuit B. The output signals are derived from output terminals 23, 24, 25 and 26, and the reset signal is applied to the termal RE.

Brightness-Level Selecting Circuit D

The brightness-level selecting circuit D has the function of determining an aperture dependent upon the brightness of a subject. That is, the high-level output signal is derived from an output terminal 35 of a comparator 73 when the voltage across a resistor 36 connected in series to a light sensor 28 for detecting the brightness of a subject exceeds the voltage or potential at the junction between a resistor 34 and parallel resistors 30, 31, 32 and 33 which are connected to the output terminals 23 through 26 of the memory circuit C. The voltage across the resistor 36 is in proportion to the quantity of light incident on the light sensor 28.

Exposure-Time Control Circuit E

The function of the exposure-time control circuit E is to determine an exposure time or shutter opening time in response to the brightness of a subject. That is, when the voltage at the junction between a resistor 40 and the upper terminals of parallel resistors 41, 42, 43 and 44 which in turn are connected to the output terminals 23 through 26 of the memory circuit C, turns off a transistor 38 as the high-level output signals from the memory circuit C are applied to the parallel resistors 41 through 44, an integrating capacitor 39 is charged with the voltage across a light sensor 37 for detecting the brightness of a subject. When the voltage across the capacitor 39 exceeds the voltage at said junction between the resistor 40 and the parallel resistors 41 through 44, the high-level signal is derived from an output terminal 46 of a comparator 72. Therefore this control circuit D determines an exposure time depending upon a time constant which in turn is dependent upon the resistance of the light sensor 37 and the capacitance of the integrating capacitor 39, after the transistor 38 has been driven into the nonconducting state.

Drive Control Circuit F

In response to the simultaneous application of the output from the brightness-level selecting circuit D to the input terminal 47 and of the output from the exposure-time control circuit E to an input terminal 48 through the closing-signal generating circuit G, the output signal is derived from an output terminal 50. In response to the level of the output signal, the pulse generator circuit B is controlled as described hereinbefore.

Closing-Signal Generating Circuit G

In response to the low-level output signal applied to an input terminal 51 from the exposure-time control circuit E, this circuit G generates the low-level closing signal at an output terminal 52.

Reset Circuit H

The reset circuit H generates the reset signal at an output terminal 68 in response to the states of the output signals at the terminals 10, 12, 60' and WI of the motor control circuit A and at the output terminal 24 of the memory circuit C.

Power Circuit I

When a switch SWI which is interlocked with a shutter release means (not shown) is closed, transistors 53 and 54 are conducted so that the current flows from a (+) terminal 56 of a power supply 56 to a terminal 57. In response to the reset signal from the reset circuit H applied to a terminal 58, a transistor 59 is conducted so that the transistor 54 is turned off and consequently the power supply to the terminal 57 is interrupted.

Reset Release Circuit J

The reset signal is applied to a terminal 60 simultaneously when the power circuit I starts the supply of power to other circuits A through J through the terminal 57, and then a transistor 63 is turned on a predetermined time later, the predetermined time being depending upon the values of a resistor 61 and a capacitor 62.

The above described circuite A through J coact, in response to the brightness of a subject, to control the angle of rotation of the stepping motor 1 so that the shutter blades 4 and 5 are driven to correctly define or set the optimum aperture for the optimum exposure time as will be described in more detail hereinafter.

Mode of Operation

The aperture which is set by the aperture setting sections 8 and 9 of the shutter blades 4 and 5 (See FIG. 1) is controlled dependent with the number of driving pulses applied to the stepping motor 1. For instance, the aperture is set to F11.0 in response to one driving pulse; to F8.0 in response to two driving pulses, to F5.6 in response to three driving pulses and to F4.0 in response to four pulses.

The fundamental circuit for setting an aperture in response to the number of driving pulses applied to a stepping motor depending upon the brightness of a subject is disclosed in detail in U.S. patent application Ser. No. 519,653.

Figure 3:
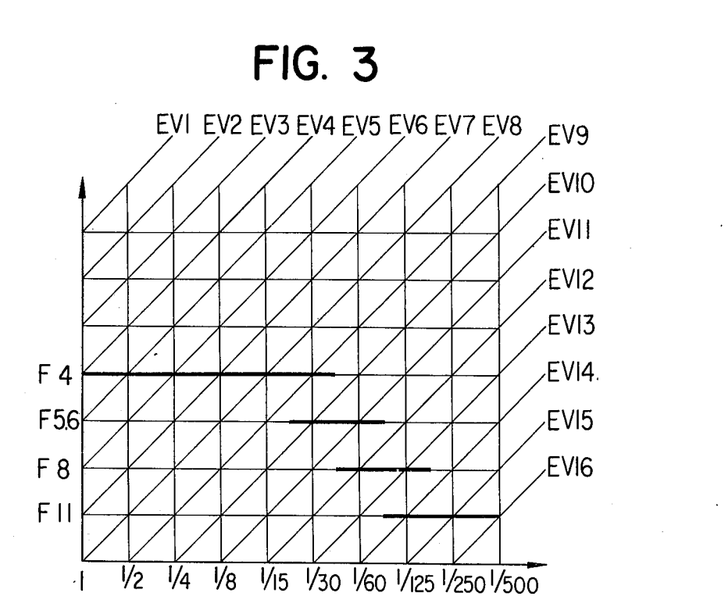
FIG. 3 is diagram illustrating one example of an exposure programme used in the first embodiment.

In this embodiment, the exposure control is made according to the programme as indicated by the bold lines in FIG. 3. That is, with F11.0, EV is between 16 and 13.5; with F8.0 EV, between 13.5; and 11.5; with F5.6, between 11.5 and 9.5; and with F4.0, EV is less than 9.5.

Referring back to FIG. 2, when the shutter release button or the like is depressed, the switch SW1 is closed so that the transistor 53 is turned on and then the transistor 54 is turned on. The power is supplied to the circuits A through J from the power supply 55, and simultaneously the high-level signal is applied through the terminal 60 to the terminal 60° of the reset circuit H so that the reset signal appears at the output terminal 68 and is applied to the motor control circuit A and the memory circuit C. As a result, the circuits A and C are reset for a predetermined short time interval. After a predetermined time which is dependent upon the values of the resistor 61 and the capacitor 62 in the reset release circuit J, the transistor 63 is turned on so that the output signal at the terminal 60 falls to a low level or changes into the reset release signal. Therefore the motor control circuit A and the memory circuit C are released from the reset state and are ready for operation.

In response to the reset release signal at the terminal 60, the signal at the input terminal 19 of the pulse generator circuit B drops to a low level. In the initial state of operation the signal at the input terminal 18 is kept at a low level. Therefore, the pulse generator circuit B is activated so that the pulse signals are derived from the terminal 20.

Figure 4:
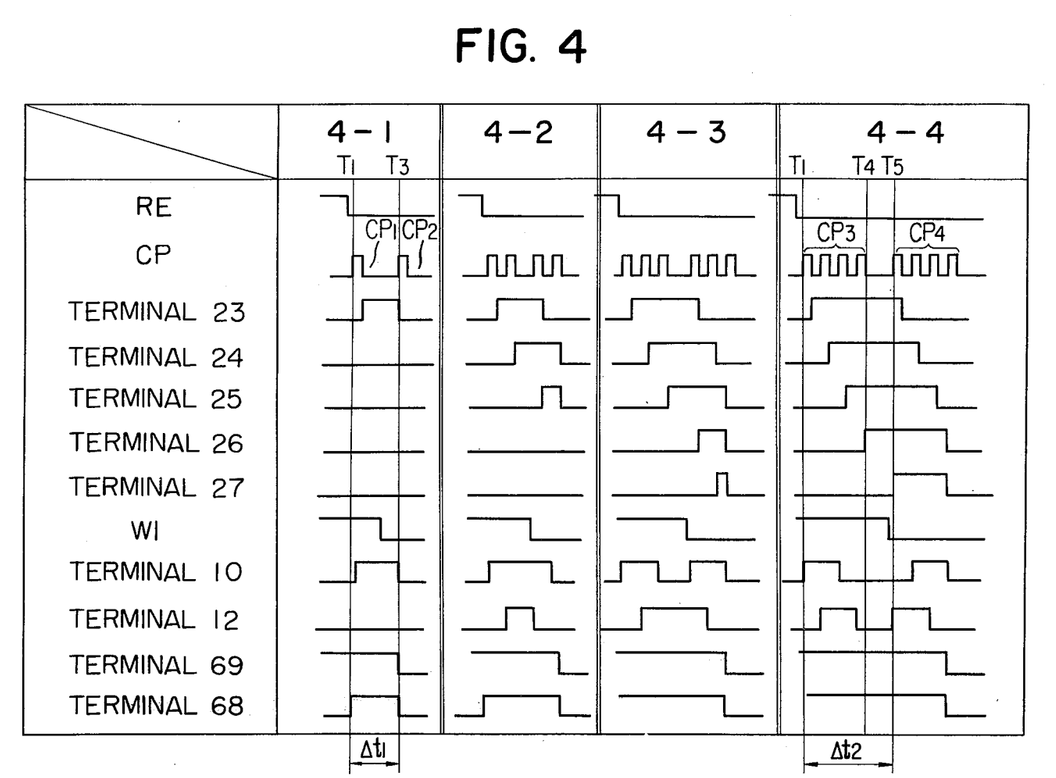
FIG. 4 is a time chart used for the explanation of the mode of operation of the first embodiment.

In response to the number of output pulses, the signals at various terminals change as shown in FIG. 4. First the operation in response to one output pulse will be described with reference to the time chart 4-1 in FIG. 4. In response to the leading edge of the first pulse signal CPI, the motor control circuit A is actuated to selectively turn on the buffer amplifiers 14 through 17 so that the stepping motor 1 is rotated one step. Since the signal at the terminal WI is at a high level, the stepping motor 1 is rotated in the forward direction. Therefore the shutter blades 4 and 5 are driven one step, setting the aperture F11.0.

The signal at the terminal 22 of the memory circuit C is also at a high level so that a flip-flop D1 is actuated to raise the signal at the terminal 23 to a high level. The high-level signal is applied to the resistor 41, and the voltage across the resistor 41 is applied to one input terminal of the comparator 72. The high-level signal is inverted to a low-level signal by the invertor interconnected between the terminal 23 and the resistor 41, and is applied to the base of the transistor 38 so that the latter is turned off. As a result, the integrating capacitor 39 with the current flowing from the light sensor 37.

When the brightness of a subject is very high, the voltage across the resistor 36 of the brightness-level selecting circuit D is higher than the voltage at the junction between the resistor 34 and the resistor 30 which in turn is connected to the output terminal 23 so that the output signal at the output terminal 35 of the comparator 73 rises to a high level and consequently the output at the terminal 50 of the drive control circuit F also rises to a high level. Therefore the high-level signal is applied to the input terminal 18 of the pulse generator circuit B so that this circuit is de-energized. Thus, only one pulse is generated as shown at 4-1 in FIG. 4, and both the motor control circuit A and the memory circuit C respond to only one pulse and then are de-energized. Therefore the stepping motor 1 is driven one step in the forward direction in which the shutter blades 4 and 5 are opened to set the aperture F11.0. Under these conditions, only the flip-flop D1 in the memory circuit C stores the signal. In response to the output from the output terminal 23 of the memory circuit C, the transistor 38 in the exposure time control circuit E is turned off so that the capacitor 39 is charged. After a time interval $\Delta t1$ which is dependent upon the resistance of the light sensor 37 which in turn is dependent with the brightness of a subject and the value of the capacitor 39, the voltage across the capacitor 39 exceeds the voltage at the junction between the resistor 40 and the resistor 41 which in turn is connected through an inverter to the terminal 23 so that the output at the output terminal 46 of the comparator 72 rises to a high level and consequently the signal at the input terminal of the closing signal generating circuit G rises to a high level. Therefore the output at the output terminal 52 thereof falls to a low level and is transmitted to the input terminal 48 of the drive control circuit F. As a result, the output signal at the output terminal 50 of the drive control circuit F falls again to a low level so that the pulse generator circuit B is activated again to generate the next pulse CP2 at T3. At T3 the signals at the terminals WI of the motor control circuit A and the terminal 22 of the memory circuit C are at a low level as shown in FIG. 4-1 (these signals being at a high level when the shutter blades are opened) so that the stepping motor 1 is rotated one step in the reverse direction in which the shutter blades 4 and 5 are closed and consequently the aperture is closed.

So far the mode of operation has been described when the brightness of the subject is high. That is, when the brightness of a subject is higher than EV 13.5, the aperture F11.0 is selected as indicated by the hold line (1) in FIG. 3, and the shutter speed or exposure time is varied between 1/500 and 1/90 sec. When the aperture F8.0 is selected, the exposure time is varied between 1/200 and 1/45 sec.

An EV at which the aperture F11.0 is selected may be suitably adjusted by the adjustment of the value of the resistor 30 in the brightness-level selecting circuit D in the manner described above while the exposure time corresponding to the selected aperture may be suitably adjusted by the adjustment of the value of the resistor 41 in the exposure time control circuit E.

Next the mode of operation when the brightness of a subject is low will be described. In this case, the voltage across the resistor 36 in the brightness-level selecting circuit D cannot exceed the voltage at the junction between the resistors 30 and 34 so that the pulse generator circuit B is kept activated, generating the pulses CP in successsion and the shutter blades 4 and 5 are opened wider.

First let it be assumed that two pulses are generated in succession. The two pulses are stored in the flip-flops D1 and D2 in the memory circuit C so that both the outputs from the output terminals 23 and 24 are at a higher level. Since two pulses are applied to the motor control circuit A when the signal at the terminal WI is at a high level, the stepping motor 1 is driven two steps in the forward direction so that the shutter blades 4 and 5 are opened to set the aperture F8.0. In the exposure-time control circuit E, the resistors 41 and 42 are connected in series because they are connected to the output terminals 23 and 24 of the memory circuit C at which appear the high-level output signals.

When the voltage across the resistor 36 is still lower than the voltage at the junction between the resistor 34 and the resistors 30 and 31 because the brightness of a subject is lower, the pulse generator circuit B is kept activated, generating three pulses CP. These pulses are stored in the flip-flops D1, D2 and D3 in the memory circuit C. In like manner, when the brightness of a subject is still lower, the pulse generator circuit B generates four pulses CP in succession as indicated at 4-4 in FIG. 4, and these pulses are stored in the flip-flops D1 through D4 in the memory circuit C.

The mode of operaion when four pulses CP3 (See FIG. 4, 4-4) are generated in succession will be described hereinafter. These four pulses CP3 are applied to the stepping motor 1 so that the exposure control mechanism 2 shown in FIG. 1 selects the aperture F4.0. The output signals at the output terminals 23, 24, 25 and 26 rise sequentially to a high level as shown at 4-4 in FIG. 4 in responses to the leading edges of the first through fourth pulses CP. Therefore at T4; that is, the time when the leading edge of the fourth pulse CP rises, the output signals at the output terminals 23 through 26 are all at a high level. The voltage across the resistor 36 exceeds the voltage at the junction between the resistors 30 through 33 so that the pulse generator circuit B is de-energized in a manner substantially similar to that described elsewhere.

When the output signal at the output terminal 23 of the memory circuit C rises to a high level, the transistor 38 of the exposure-time control circuit E is turned off and the integrating capacitor 39 is charged. Since the brightness of a subject is considerably low, the resistance across the light sensor 37 is high so that the time constant with which the capacitor 39 is charged becomes longer. That is, the time required for the voltage across the capacitor reaching a predetermined level becomes longer as indicated at Δt2 in FIG. 4. When the voltage across the capacitor 39 exceeds the voltage at the junction between the resistor 40 and the parallel-connected resistors 41 through 44; that is, at time T5, the output signal at the output terminal 46 of the comparator 72 rises to a high level.

At T5 the signal at the terminal WI of the motor control circuit A falls to a low level so that the pulse generator circuit B generates four pulses CP4 in succession. Therefore the stepping motor 1 is driven four steps in the reverse direction so that the aperture F4.0 is closed. Since the aperture control mechanism 2 sets the aperture F4.0 in response to four pulses, four pulses are required for it to close its aperture.

The reset circuit H for selecting the pulse signals and deactivating the whole control circuit comprises means for selecting the number of pulses required for closing the aperture and equal to the number of pulses for setting a desired aperture, and means for deactivating the whole control circuit after the pulses required for closing the aperture have been generated.

The mode of operationf of the reset circuit H as well as that of the motor control circuit A will be described hereinafter in conjunction with the stepping motor of the conventional type in which two out of four driving coils are selectively excited.

Figure 5:
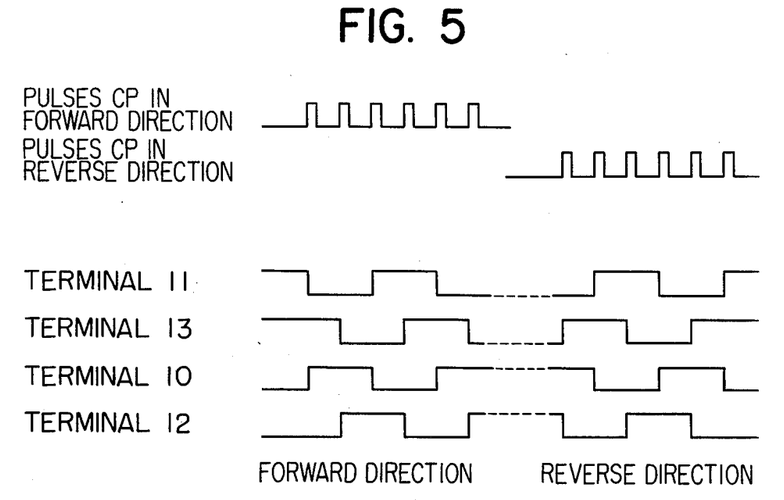
FIG. 5 shows the waveforms of the pulses applied to the input terminal of the control circuit shown in FIG. 2 and the output signals at the output terminals thereof.

FIG. 5 shows the waveforms of the pulses applied to the terminal CP of the motor control circuit A and the output signals derived from the output terminals 10 through 13 thereof. In response to the output signals derived from the output terminals 10 through 13, the four driving coils of the stepping motor 1 are selectively excited so that the motor is driven. That is, in response to the pulses CP in the forward direction shown in FIG. 5, the shutter blades are opened while in response to the pulses CP in the reverse direction, they are closed. Therefore, as shown in FIG. 2, two D-flip-flops 64 and 65 are interconnected through two EXCLUSIVE OR gates 66 and 67 so that the driving coils of the stepping motor 1 may be sequentially energized.

However, the stepping motor 1 employed in the present invention must rotate in the reverse direction in the same steps with those in which the stepping motor 1 has been rotated in the forward direction. The reset circuit H is provided in order to accomplish this function.

Next the mode of operation of the reset circuit H will be described in more detail in conjuncton with the case in which four pulses are generated to set the aperture F4.0 because the brightness of a subject is low. The reset circuit H is connected to the terminals 10, 12, 60' and WI of the motor control circuit A and to the output terminal 24 of the memory circuit C, and is actuated in response to the output signal at the output terminal 24. The reset circuit H includes a logic circuit which gives the reset signal at the terminal 68 when the output signals at the terminals 10, 12, WI, 60' and 24' fall to a low level. That is, when the output signals at these terminals fall to a low level, the output signal at the reset terminal 68 also falls to a low level so that the motor control circuit A and the memory circuit C are reset and the signal at the terminal 69 drops to a low level.

The transistor 59 in the power circuit I is turned on when the voltage across a capacitor 70 rises a predetermined level (the time required for the voltage across the capacitor 70 to reach a predetermined level being dependent upon the values of the capacitor 70 and a resistor 71) so that the base circuit of the transistor 53 is short-circuited and consequently the transistor 53 is turned off. As a result, the power supply is interrupted. As described above, the reset circuit H selects the number of pulses required for the aperture control mechanism shown in FIG. 1 to close its aperture, the number of pulses being equal to the number of pulses in response to which the aperture control mechanism is driven to set a required aperture.

In like manner, the reset circuit H selects the number of pulses required for closing the aperture F8.0 or F5.6 as shown in 4-2 or 4-3 in FIG. 4.

Figure 6:
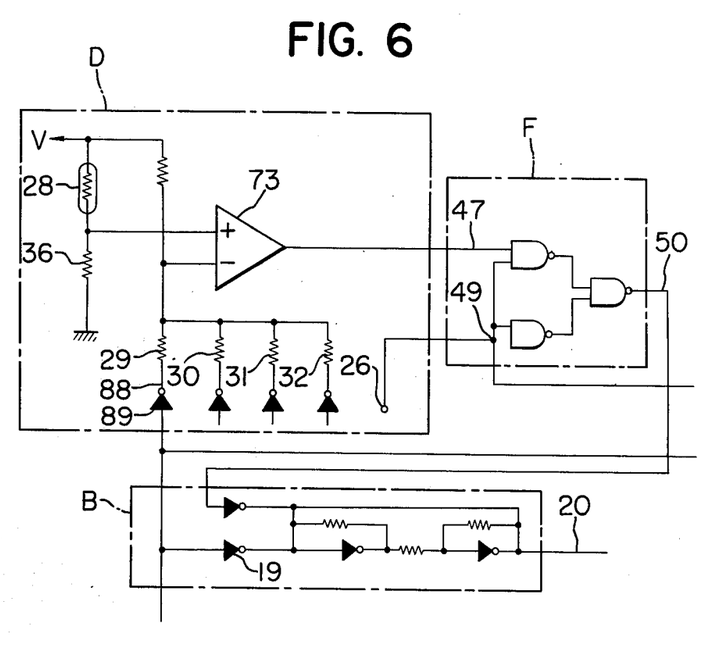
FIG. 6 is a circuit diagram of a modification of a brightness-level selecting circuit shown in FIG. 2.

So far the mode of setting an aperture between the maximum or F4.0 and the minimum of F11.0 aperture has been described, but it is not necessary to select the output terminal 26 of the memory circuit C in order to set the maximum aperture F4.0. For instance, in the circuit shown in FIG. 6 the terminal 26 of the memory circuit is disconnected from the resistors 30, 31 and 32 of the brightness-level selecting circuit D when the aperture control mechanism 2 sets the maximum of F4.0 aperture and is connected to a terminal 49 of the drive control circuit F. Then the signal at the output terminal 50 of the drive control circuit F is always maintained at a high level regardless of the level of the output from the brightness-level selecting circuit so that the pulse generator circuit B is de-energized. This arrangement has a distinct advantage in that the erratic setting of an aperture can be eliminated because even when the pulse signal is applied to, for instance, the brightness level selecting circuit when the desired aperture is set and maintained, the output signal at the output terminal 50 of the drive control circuit F is at a high level so that the actuation of the pulse generator circuit B is prevented.

As described above, according to the present invention in response to the brightness of a subject an aperture, an exposure time for a selected aperture and a level at which an aperture is changed over may be suitably controlled so that in addition to the shutter control programme as shown in FIG. 3, various shutter control programmes may be obtained.

Figure 7:
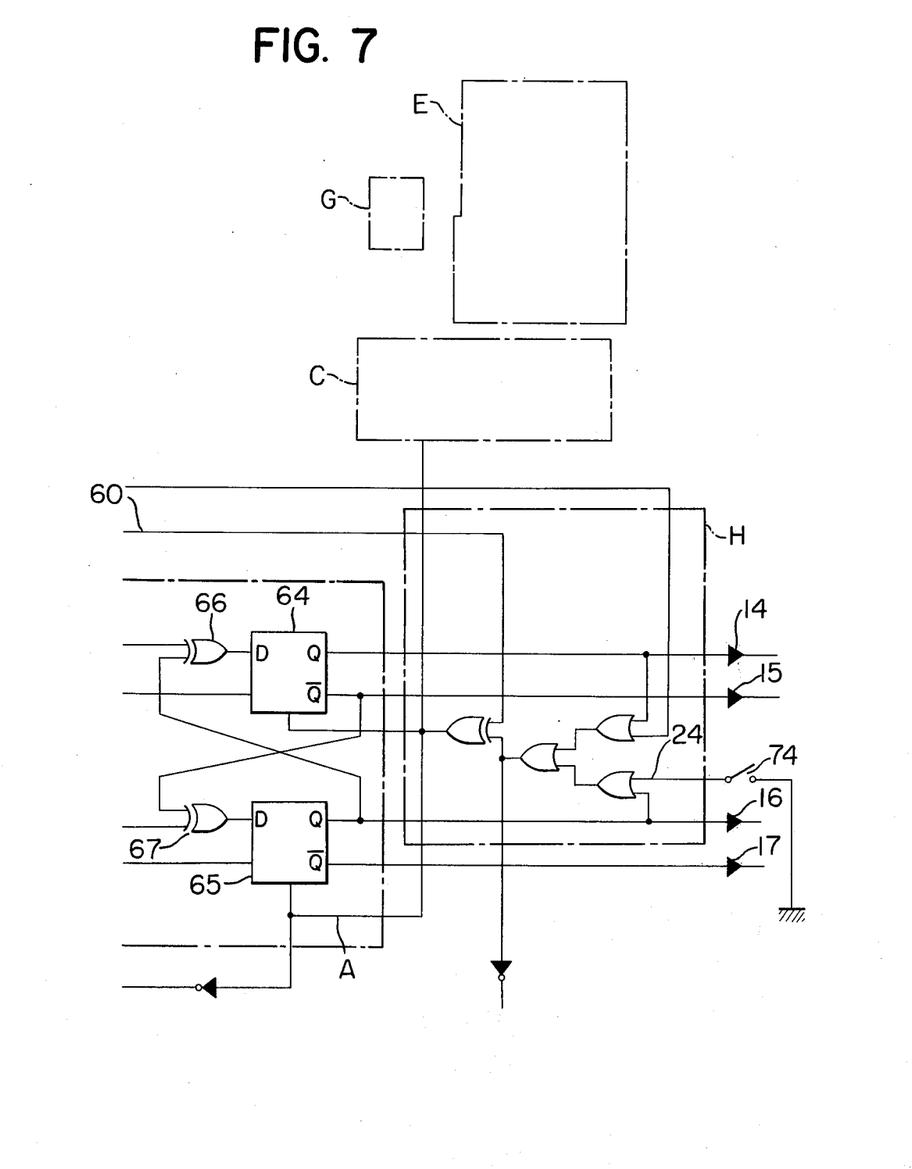
FIG. 7 is a circuit diagram of a modification of a reset circuit shown in FIG. 2.

SECOND EMBODIMENT, FIGS. 7 AND 8

Figure 8A:
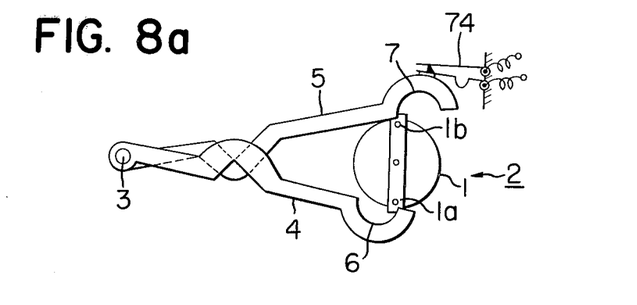
FIGS. 8a and 8b are front views of an exposure control mechanism incorporating switching means.
Figure 8B:
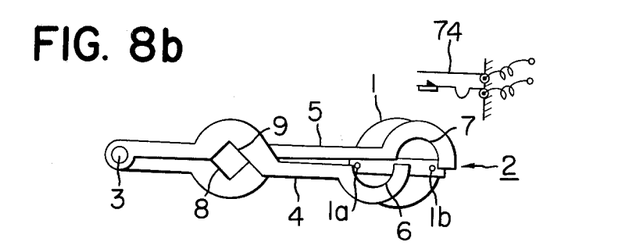

The second embodiment of the present invention will be described hereinafter with reference to FIGS. 7, 8a and 8b. A switch 74 which is closed or opened when the aperture 8 and 9 of the shutter blades 4 and 5 are closed or opened as shown in FIGS. 8a and 8b, is connected to a terminal 24 of the reset circuit H. The switch 74 is opened when the aperture 8 and 9 of the shutter blades 4 and 5 are opened, and remains opened until the shutter blades 4 and 5 return to their initial positions, closing the aperture. Therefore when the shutter blades 4 ad 5 are opened, the signal at the terminal 24 of the reset circuit H remains at a high level so that the circuits A through J operate to close the shutter blades 4 and 5. When the shutter blades are closed, the switch 74 is closed so that the signal at the terminal 24 falls to a low level. As a result the circuits A–J are reset. That is, these circuits stop their functions only after the shutter blades have been closed.

The second embodiment can eliminate the problem that the generation of the shutter-blade closing pulses is interrupted before the shutter blades are closed due to the mechanical shock or time lag so that the aperture remains opened. That is, even when there exists some time lag between the applicaion of the control signal and the operaton of the shutter blades, the circuits A through J are kept energized until the shutter blades are completely closed. Therefore the complete closure of the shutter blades can be ensured.

ADDITIONAL FUNCTIONS, FIG. 2

In order to make the programme-controlled shutter in accordance with the present invention more useful in practice, the fundamental system described above may include further means for accomplishing various functions to be described below with reference to FIG. 2.

The first additional function is to display the brightness of a subject by the use of a brightness detecting or photometric circuit K. A brightness check switch SW2 which is connected to the power supply 55 is interlocked with a shutter button (not shown) in such a manner that it may be closed before the switch SW1 is closed so that the shutter blades 4 and 5 are opened. That is, when the shutter button is depressed, the switch SW2 is closed, and when the shutter button is further depressed the switch SW1 is closed. When the switch SW2 is closed, the signal at the terminal 60 of the reset release circuit J rises to a high level, but the high-level signal is inverted into the low-level signal by an inverter 89 so that the low-level signal is applied to a terminal 88 of the brightness-level selecting circuit D. Therefore, the circuit D is actuated.

The high-level signal is also transmitted from the terminal 60 to a terminal 75 of the brightness detecting circuit K. The signal at a terminal 76 remains at a low level until a capacitor 77 is charged. That is, the signal at the terminal 76 rises to a high level after the capacitor 77 has been charged.

Assume that the brightness of a subject is too low. Then the light sensor 28 exhibits a high resistance so that the voltage across the resistor 36 cannot exceed the voltage at the junction between the voltage dividing resistors 29 and 34. Therefore the signal at the terminal 35 is at a low level and consequently the signal at a terminal 91 of the brightness detecting circuit K is also at a low level so that a light emitting diode 79 is energized to display that the brightness of a subject is too low to take a photo without the aid of a flash lamp or the like.

When the brightness of a subject is sufficiently high, the light sensor 28 exhibits a low resistance so that the voltage across the resistor 36 exceeds the voltage at the junction between the voltage dividing resistors 29 and 34. As a result the signal at the terminal 35 rises to a high level and is transmitted to the terminal 91 of the brightness detecting circuit K. Therefore the signal at an output terminal 78 rises to a high level so that the light emitting diode 79 remains de-energized, displaying that the brightness of a subject is sufficiently high or flash-exposure is not required.

When the brightness detecting circuit K is operating, the signal at the terminal 60 of the reset release circuit J remains at a high level so that the other circuits are not actuated and consequently the stepping motor 1 remains de-energized.

The brightness detecting circuit K has a further function of energizing the light emitting diode 79 only during the time when the shutter blades are driven so that a user can check the operation of the shutter blades. That is, when the shutter button is further depressed so that the first switch SW1 is closed, the signal at the terminal 60 of the reset release circuit J falls to a low level a predetermined time latter in the manner described above, time which is dependent upon the values of the capacitor 62 and the resistor 61. Therefore the signal at the terminal 75 of the brightness detecting circuit K falls to a low level. When the capacitor 77 is charged, the signal at the terminal 76 rises to a high level so that the signal at the output terminal 78 drops to a low level. As a result the light emitting diode 79 is turned on. When the signal at the terminal 75 rises to a high level after the shutter blades are opened for a predetermineedtime, the signal at the terminal 78 rises to a high level so that the light emitting diode 79 is turned off. Therefore the time during which the light emitting diode 79 is turned on is equal to the exposure time or shutter speed.

The second additional function is to check the power supply or battery by the use of a power supply check circuit L including a light emitting diode display means 84. When a double-pole, single-throw switch SW3 is closed, the power supply 55 is connected to the collector of a transistor 80 and the light emitting diode 84. The base of the transistor 80 is connected through a zener diode or the like 82 and a base resistor 81 to the power supply, and is grounded through a resistor 83. When the voltage of the power supply 55 is in excess of a zener or breakdown voltage of the diode 82, the voltage across the resistor 83 causes the conduction of the transistor 80 so that the power check light emitting diode 84 is turned on, displaying that the power supply is still serviceable. However, if the voltage of the power supply is lower than a critical level or breakdown voltage of the zener diode 82, there exists no voltage drop across the resistor 83 so that the transistor 80 is cut off and consequently the light emitting diode 84 remains off, displaying that the power supply is discharged or not serviceable.

Figure 9A:
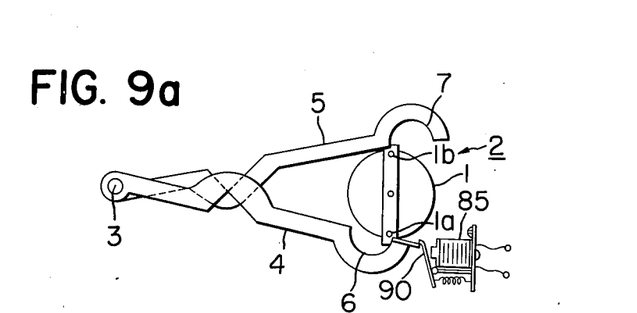
FIGS. 9a and 9b are top views of an exposure control mechanism incorporating a shutter blade locking means.
Figure 9B:
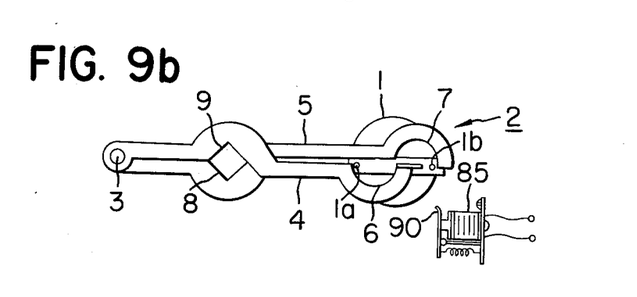

The third additional function is to lock the shutter blades in closed position by the use of a shutter blade locking circuit M including an electromagnet 85 (See FIG. 9). When the shutter blades 4 and 5 are in the closed position as shown in FIG. 9a, a locking member 90 formed integral with an armature of the electromagnet 85 engages with the shutter blade 4, whereby the shutter blades 4 and 5 are locked. However, when the shutter release button is depressed, the electromagnet 85 is energized before the stepping motor 1 is driven so that the locking member 90 is attracted by the magnet 85 away from the shutter blade 4 and consequently the shutter blades 4 and 5 are released. More particularly, the power supply 55 is connected through the transistor 54 in the power circuit I and the electromagnet 85 to the collector of a transistor 86. The base of the transistor 86 is connected through a resistor 87 and the transistor 54 to the power supply 55. When the switch SW1 is closed, the transistor 54 is turned on so that the transistor 86 is also turned on and the electromagnet 85 is energized, releasing the shutter blades 4 and 5. In this case, the reset signal is applied to other circuits as described above so that the stepping motor 1 is not driven yet. A predetermined time after the switch SW1 is closed, other circuits are released from the reset state in the manner described hereinbefore so that the stepping motor 1 is driven. The time lag of the electromagnet 85 has no adverse effect on the operation of the shutter blades 4 and 5. When the shutter blades are opened and then closed, the transistor 54 in the power circuit I is turned off in the manner described above so that the transistor 85 is turned off and consequently the electromagnet 85 is de-energized, locking the shutter blades 4 and 5.

The shutter blade locking mechanism serves to hold the shutter blades in closed position even when strong shock is exerted to the camera. That is, when the stepping motor is not driven, the shutter blades are held in closed position under the attracting force interacting between a permanent magnet rotor of the stepping motor 1 and a stator thereof. However, when the shock imparted to the camera is in excess of this attracting force, the shutter blades are displaced from closed position. However, the locking mechanism in accordance with the present invention can securely hold the shutter blades in closed position even when strong shock acts on the camera.

What is clamed is:

1. A programme-controlled shutter comprising
   a. an exposure control mechanism comprising
      a stepping motor, and
      a plurality of shutter blades which function also as aperture setting blades and which are mechanically coupled to said stepping motor in such a way that when said stepping motor is driven, said shutter blades are opened and closed;
   b. a motor control circuit with a first input terminal to which are applied the pulse signals for driving said stepping motor and a second input terminal to which is applied the signal for determining the direction of rotation of said stepping motor;
   c. a pulse generator circuit for generating said driving pulses in succession;
   d. a memory circuit having a plurality of output terminals and generating the output signals at said plurality of output terminals in response to the number of the pulse signals transmitted thereto from said pulse generator circuit;
   e. a first control means including a first photometric circuit for measuring the brightness of a subject, said first control means controlling said pulse generator circuit by the comparison of the output signal from said first photometric circuit with the output signals from said output terminals of said memory circuit; and
   f. a second control means including a second photometric circuit for measuring the brightness of a subject, said second photometric circuit being actuated in response to the output signals from said output terminals of said memory circuit,
      said second control means generating the closing signal for closing said shutter blades when the light brightness detection quantity measured by said second photometric circuit reaches a predetermined level.
      said closing signal being applied to said second input terminal of said motor control circuit and to said first control means, whereby said shutter blades are closed.

2. A programme-controlled shutter as set forth in claim 1 further comprising
   a third control means for controlling the oerations of said circuits and said first and second control means.

3. A programme-controlled shutter as set forth in claim 1
   wherein said memory circuit consists of a shift register of the type in which the output signals are sequentially derived from said output terminals.

4. A programme-controlled shutter as set forth in claim 1 wherein said first photometric circuit comprises
   a first light sensor means, and
   a first resistor connected in series to said light sensor means; and
   said programme-controlled shutter further comprising
      a first voltage generating means for generating a first voltage in response to the output signals from said memory circuit,
      a first comparator means for comparing the voltage across said first resistor with said first voltage and generating a first output signal,
      a drive control circuit actuable in response to said first output signal from said first comparator means for generating the control signal which is applied to said pulse generator circuit for controlling the same.

5. A programme-controlled shutter as set forth in claim 1 wherein said second control means comprises
   said second photometric circuit for measuring the brightness of a subject,
   a second voltage generating circuit for generating a second voltage in response to the output signal from said memory circuit,
   a second comparator means for comparing the output from said second photometric circuit with said second voltage and generating a second output signal, and
   a time signal holding circuit actuable in response to said second output signal for generating said closing signal.

6. A programme-controlled shutter as set forth in claim 2
   wherein said third control means comprises
      a power circuit for supplying the power to said first and second control means, said motor control circuit, said pulse generator circuit, and said memory circuit; and a reset release circuit which is connected to said power circuit and is actuable when the power is supplied therefrom for resetting said motor control circuit and said memory circuit and setting them again a predetermined time later while simultaneously actuating said pulse generator circuit.

7. A programme-controlled shutter as set forth in claim 4 wherein said first photometric circuit consists of a series-connected circuit consisting of a first light sensor means and a first resistor; and said first voltage generating circuit a first bank of resistors each of which is connected in series to each of said output terminals of said memory circuit and which are selectively connected in parallel depending upon the output signals from said plurality of output terminals of said memory circuit, and a first resistor connected in series to said first bank of resistors for dividing a voltage.

8. A programme-controlled shutter as set forth in claim 5 wherein said second photometric circuit consists of a series-connected circuit consisting of a second light sensor means and a first capacitor; and said second voltage generating circuit comprises a second bank of resistors each of which is connected in series to each of said plurality of output terminals of said memory circuit and which are selectively connected in parallel depending upon output signals from said plurality of output terminals of said memory circuit, and a second resistor connected in series to said second bank of resistors for dividing a voltage.

9. A programme-controlled shutter as set forth in claim 6 wherein said power circuit comprises a first switching circuit actuable in response to the shutter release for permitting said power supply, and a second switching circuit actuable after said shutter blades of said exposure control mechanism are opened and closed for turning off said first switching circuit.

10. A programme-controlled shutter as set forth in claim 6 wherein said reset release circuit comprises a first switching means, and a time constant circuit for applying to said first switching means the gate voltage for turning on said first switching means a predetermined time after said power circuit is actuated.

11. A programme-controlled shutter as set forth in claim 8 wherein said power circuit comprises a first switching circuit actuable in response to the release of the shutter for permitting said power supply, and a switching means which is turned on after said shutter blades have accomplished a desired opening and closing operation, thereby turning off said first switching circuit.

12. A programme-controlled shutter as set forth in claim 8 wherein sad reset release circuit comprises a first switching means, and a time constant circuit for applying the gate voltage to said first switching means for turning on the same a predetermined time after said power circuit is actuated.

13. A programme-controlled shutter as set forth in claim 8 further comprising a reset circuit connected to said motor control circuit, said memory circuit, said reset release circuit and said second control means and actuable in response to the signals from said motor control circuit, said memory circuit, said reset release circuit and said second control means for generating the power supply interruption signal when said shutter blades are closed, said power supply interruption signal being applied to said power circuit, whereby said power circuit is deactivated.

14. A programme-controlled shutter as set forth in claim 8 further comprising a reset circuit having a first input terminal connected to the output terminal of said reset release circuit, a first switch which is closed when said shutter blades are closed, a second input terminal to which is grounded through said first switch, a third input terminal to which is applied said closing signal from said second control means, and an output terminal connected to said power circuit, whereby said reset circuit is actuated when said first switch is closed to generate the power supply interruption signal which is transmitted from said output terminal to said power circuit for deactivating the same.

15. A programme-controlled shutter as set forth in claim 9 wherein said first voltage generating circuit is so arranged that all of said plurality of resistors in said first bank each of which is connected to each of said plurality of output terminals of said memory circuit are selectively short-circuited.

16. A programme-controlled shutter as set forth in claim 10 further comprising a switching means for short-circuiting said first capacitor until the output signals from said plurality of output terminals of said memory circuit are received.

17. A programme-controlled shutter as set forth in claim 11 wherein said first switching circuit comprises a first switching means which is closed in response to the shutter release, and a second switching means which is closed when said first switching means is closed, thereby permitting said power supply.

18. A programme-controlled shutter as set forth in claim 11 further comprising a time constant circuit for generating the gate voltage which is applied to said switching means so that the latter is closed a predetermined after said shutter blades are closed.

19. A programme-controlled shutter as set forth in claim 1 further comprising a power source checking means for checking a power source which supplies the power to said exposure control mechanism, said first and second control means, said motor control circuit, said pulse generator circuit and said memory circuit, said power source checking means comprising a switching means which is closed when the voltage of said power supply is at a predetermined level, and a light emitting means which is turned on when said switching means is closed.

20. A programme-controlled shutter as set forth in claim 1 further comprising a brightness detecting means comprising a first switch, and a display circuit connected to said first photometric circuit for emitting light when the level of the output signal from said first photometric circuit is less than a predetermined level when said first switch is closed.

21. A programme-controlled shutter as set forth in claim 20 wherein
said first switch is closed in response to the depression of a shutter release button for opening and closing said shutter blades.

* * * * *

UNITED STATES PATENT OFFICE
CERTIFICATE OF CORRECTION

Patent No. 4,072,963  Dated February 7, 1978

Inventor(s) Hiroshi Iwata, et al

It is certified that error appears in the above-identified patent and that said Letters Patent are hereby corrected as shown below:

Column 3, line 10:   "RH" should be --RE--.

Column 4, line 48:   "circuite" should be --circuits--.

Column 5, line 13:   "60°" should be --60'--.

Column 7, line 12:   "operaion" should be --operation--.

line 58:   "operationf" should be --operation--.

Column 9, line 19:   "ad" should be --and--.

Column 12, line 24:  "oerations" should be --operations--.

Column 13, line 61:  "sad" should be --said--.

Signed and Sealed this

Twenty-second Day of August 1978

[SEAL]

Attest:

RUTH C. MASON
Attesting Officer

DONALD W. BANNER
Commissioner of Patents and Trademarks